United States Patent [19]
Guibert et al.

[11] Patent Number: 4,964,902
[45] Date of Patent: Oct. 23, 1990

[54] METHOD OF EXTRACTING SPIN CAST FUSED SILICA

[75] Inventors: Paul Guibert, Bellegarde; Francis A. P. Launay, Pithiviers-le-Vieil, both of France

[73] Assignee: Quartz & Silice, Courbevoie, France

[21] Appl. No.: 309,585

[22] Filed: Feb. 10, 1989

[51] Int. Cl.$^5$ .............................................. C03B 19/00
[52] U.S. Cl. .............................................. 65/71; 65/266; 65/302
[58] Field of Search ................... 65/71, 302, 122, 266, 65/260, 110, 89, 239, 241, 272

[56] References Cited

U.S. PATENT DOCUMENTS

| | | | |
|---|---|---|---|
| 2,198,750 | 4/1940 | Winder | 49/29 |
| 3,150,951 | 9/1964 | Mayhew | 65/71 |
| 3,205,057 | 9/1965 | Benard | 65/260 |
| 3,419,375 | 12/1968 | Meiresonne | 65/260 |
| 4,416,680 | 11/1983 | Bruning | 65/302 |
| 4,528,163 | 7/1985 | Albrecht | 422/249 |
| 4,632,686 | 12/1986 | Brown | 65/71 |

FOREIGN PATENT DOCUMENTS

| | | | |
|---|---|---|---|
| 8431822 | 10/1984 | Fed. Rep. of Germany . | |
| 584224 | 4/1924 | France . | |
| 0584224 | 11/1924 | France | 65/260 |
| 0205238 | 1/1968 | U.S.S.R. | 65/260 |
| 0443846 | 12/1972 | U.S.S.R. | 65/260 |
| 1008165 | 3/1983 | U.S.S.R. | 65/260 |
| 0007514 | 5/1890 | United Kingdom | 65/302 |

*Primary Examiner*—David L. Lacey
*Assistant Examiner*—John J. Bruckner
*Attorney, Agent, or Firm*—Pennie & Edmonds

[57] ABSTRACT

This invention relates to a method of making an object of silica glass, such as a crucible, according to which a pot capable of rotating about its axis is filled with a refractory pulverulent material. The pot is rotated and a cylindrical cavity is formed in the material, the axis of which coincides with that of the pot. The bottom and the wall of the cavity are then formed to a certain thickness with a silica-rich material. This silica-rich material is melted, the object thus produced is cooled and then extracted vertically by an extraction mechanism comprising a gripping member which is rotating, at least initially, at the same speed as the pot.

16 Claims, 2 Drawing Sheets

METHOD OF EXTRACTING SPIN CAST FUSED SILICA

TECHNICAL FIELD

This invention concerns a method of and an apparatus for extracting from a pot an object produced by fusion of a layer of refractory material in the pulverulent state and specifically the extraction of a silica object produced by fusion of a layer of pulverulent material rich in silica.

BACKGROUND ART

It is known to manufacture such an object by means of an apparatus similar to that described as follows: a circular platform, rotatable about its central axis, hereinafter termed carousel, supports several cylindrical pots also capable of rotation about their vertical axes. The rotation of the carousel brings each pot successively into different positions which correspond to one phase of the manufacturing process. For example, silica-rich pulverulent material is fed into the pot; fusion of said material; cooling of the object produced by fusion; extraction of the object.

The pots, generally of metal, are filled with a refractory pulverulent material which provides thermal insulation. With the pot in rotation, the material is hollowed out in such a manner as to define a cylindrical cavity, the axis of which coincides with the axis of the pot. The bottom and the wall of said cavity have a uniform surface at the end of a reaming operation carried out by moving a blade or cutter vertically and horizontally. Under the action of the centrifugal force, the remaining material remains pressed against the wall of the pot.

The pot, while still rotating, arrives vertically beneath an apparatus for ensuring fusion of the wall and bottom of the cavity thus formed to a certain depth. The apparatus used is generally an electric arc. The material thus melted is a material rich in silica, which may be composed simply of the material serving as insulation, for example sand. But it may be composed of a purer material, for example quartz powder. The latter is deposited in a known manner onto the bottom and the wall of the cavity formed in the insulating material.

When fusion is completed, the carousel brings the pot into another position, where the object produced cools down. From the start of the cooling phase, the motor causing rotation of said pot is stopped.

Finally, the rotation of the carousel brings the stopped pot into another position for the extraction operation. As soon as the object has been extracted from the stationary pot, the material, which is no longer held in place by centrifugal force, collapses. To enable the pot to be used again, it is therefore necessary to reconstruct the central cavity. This return to the initial conditions is bought at the expense of a loss of time and material. Furthermore, the means used for the extraction of the object may cause defects in its surface and may result in it being rejected.

SUMMARY OF THE INVENTION

The objective of the invention is to permit objects manufactured in accordance with the above process, to be extracted, in such a manner as to prevent collapse of the material and to reestablish the uniform surface of the central cavity in a shorter time and with maximum economy of material.

A further objective is to provide a means enabling the object to be extracted while eliminating any cause of formation of defects on its internal or external surface.

These objectives are achieved by a method, according to which a pot capable of rotating about its own axis is filled with a refractory pulverulent material. The pot is rotated causing a cavity having a uniform boundary to form in said material, the axis of the cavity coinciding with that of the pot, and the bottom and wall of which cavity are formed to a determined thickness of a silica-rich material. Then said material is melted to at least a fraction of its thickness, the object formed is cooled, and the object is extracted vertically. This method consists essentially of causing the pot to rotate during the extraction operation and of extracting the object, the latter still turning, at least initially, at the same speed as the pot.

In the method according to this invention, a gripping member is brought above the rotating pot and its axis of rotation is aligned with that of the pot. A rotational speed equal to that of the pot is imparted to the gripping member and the member is applied onto the edge of the object. The pressure between the object and the gripping member is reduced and the gripping member is raised with the object adhering to it.

The apparatus for carrying out the method according to this invention is a gripping member fixed on a vertical axis, integrally connected to a motor device capable of moving it vertically. This member may be connected to a motor capable of causing it to rotate about its vertical axis at the same speed as the pot before arriving in contact with the object. This member may comprise a device which assures synchronization of the rotational speeds through the intermediary of at least one component coming into contact with the edge of the pot such as a gripping head fixed to the vertical axle and intended to be applied onto the summit of the object. The synchronization device may be integral with the gripping head or may be connected directly to the vertical axle.

The gripping head is of a heat-resistant material, for example graphite. Its dimensions are such that it comes into bearing exactly on the periphery of the object. This gripping head is perforated by at least one duct, which opens out onto its lower face, said duct communicating through the vertical axle with a vacuum pump. The zone of the gripping head which comes into contact with the edge of the object is made of a material which assures a hermetic closure.

BRIEF DESCRIPTION OF THE DRAWINGS

The characteristics of the invention and its advantages will be explained in more detail in the following description of one of its embodiments, illustrated by the attached drawing figures, wherein.

DETAILED DESCRIPTION OF THE PREFERRED EMBODIMENTS

Figure 1:
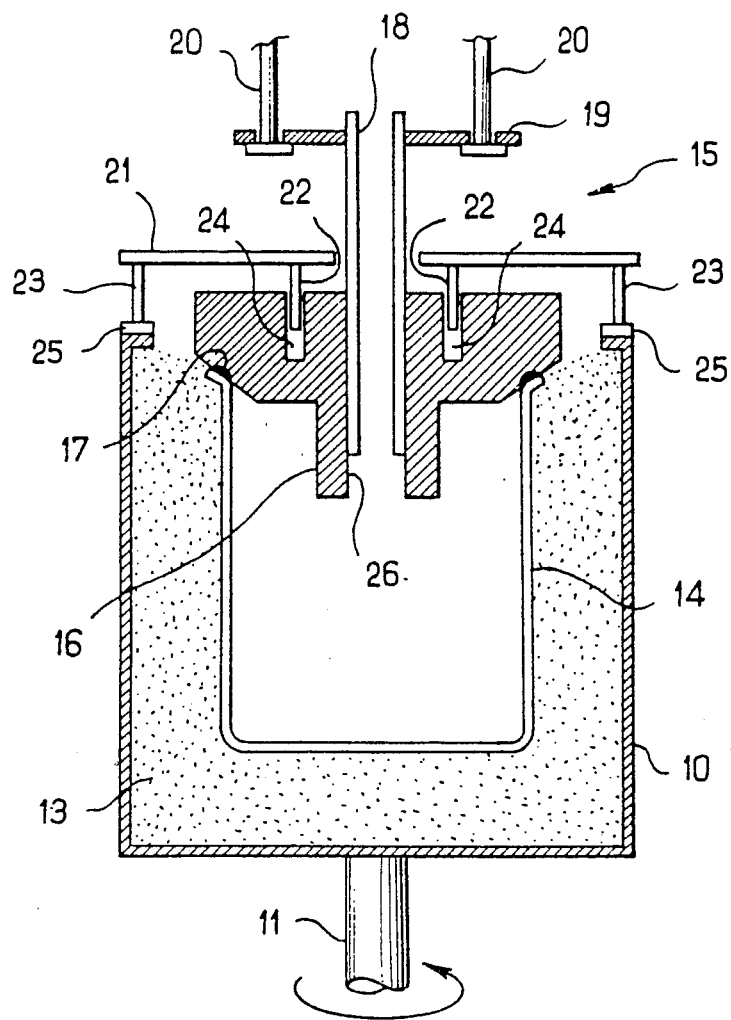
FIG. 1 is a cross-sectional view taken vertically through the center of the device of the present invention.

The installation shown in FIG. 1 comprises a pot 10 of cylindrical form, connected to a device for rotational driving, not illustrated, by means of an axle 11. This pot, preferably of metal, contains a layer of sand 13 covering the base and the wall which is kept in place under the action of the centrifugal force. Pot 10 contains, at its center, a crucible 14 of silica glass, which has just been produced by fusion of a layer of quartz powder of high purity deposited on sand layer 13 while pot 10 is rotating.

The gripping member 15 has a gripping head 16 of graphite which is equipped with an asbestos seal 17. Head 16 is traversed, throughout its height and along its axis, by a duct 26, which opens out at its lower end towards the interior of crucible 14. Head 16 is fixed to a hollow pipe 18, which is located within duct 26 and which rotates freely within a support 19. This support 19 is connected to an electrically operated jack, not show,, for vertical displacement of the gripping members 15, the displacement being guided by bars 20.

A plate 21 rests on the upper face of head 16. This plate, which may be termed a rotational synchronization member, has a diameter at least equal to that of pot 10. Rods 22, 23 are fixed vertically to the lower face of plate 21. Rods 22 engage seatings 24 formed in the top of the head 16. Rods 23 are fixed to the periphery of plate 21 and their ends are equipped with skids 25.

When the gripping member 15 is vertically displaced downwardly, the skids 25 initially bear against the edge of rotating pot 10. Plate 21 and head 16 are thus entrained in a rotary movement, the speed of which rapidly becomes equal to that of the pot. Seatings 24 allow head 16, while rotating, to continue its descent until seal 17 comes into bearing against the upper rim of crucible 14. The speed of descent of gripping member 15 is fairly low, preferably less than or equal to 2 meters per minute.

From the time the seal 17 contacts the rim of the crucible 14, a vacuum pump (not shown), which is connected to the top of pipe 18, begins to operate and is used to create a partial vacuum in crucible 14. The motor device which is used to lift gripping member 15 to is then brought into action. The lifting speed is also slow, at least at the start, so that the crucible can be removed without disturbing the adjacent sand layer 13. This speed is preferably less than or equal to 2 meters per minute.

Figure 2:
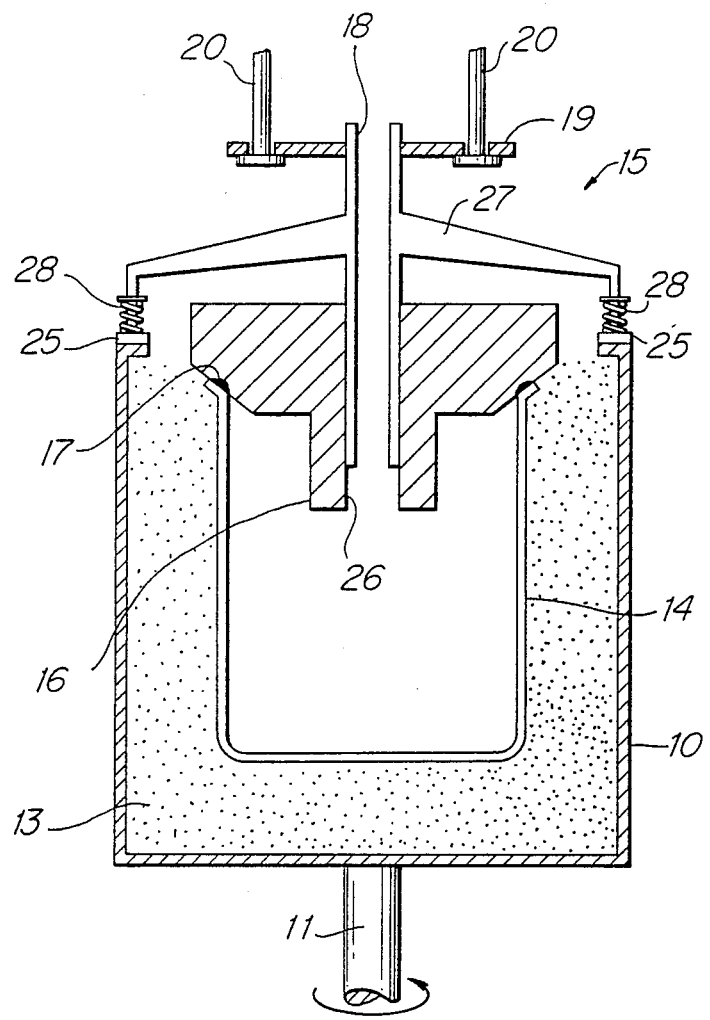
FIG. 2 is a cross-sectional view taken vertical through the center of an alternate embodiment of the device of the invention.

The embodiment described above in FIG. 1 corresponds to the category of gripping members according to which the synchronization device is integral with the gripping head 15. Alternately, this method may be carried out by a gripping member in which the synchronization device is directly fixed to the vertical axle 18, as shown in FIG. 2.

Thus, in this alternate embodiment, the synchronization device includes several arms (for example, three in number) 27 fixed to the vertical pipe 18. The end of each arm 27 is equipped with an elastic means (for example, a spring) 28 to the end of which a skid 25 is fixed. The gripping head is identical to that of gripping member 15 previously described, with the exception that it no longer comprises seatings 24. As before, the skids 25 come into contact with the pot first, and the gripping member can continue its descent by compression of the springs 28.

The foregoing description relates to examples of embodiments of the invention. It is, of course, evident that modifications or variants can be effected without thereby departing from the scope of the invention, and that the appended claims are intended to cover such modifications and variants.

What is claimed is:

1. A method of making a fused silica glass object which comprises:
    filling a pot, capable of rotating about its axis, with pulverulent refractory material;
    rotating the pot to form a cavity having a uniform boundary in said pulverulent refractory material, the axis of said cavity coinciding with the axis of the pot, and introducing a fusible silica-rich glass forming material into said cavity to form an object having a bottom and a wall of a predetermined thickness;
    melting at least a portion of the thickness of said silica-rich glass forming material without melting said pulverulent refractory material to form a fused glass silica object;
    cooling the object thus produced; and
    extracting the object vertically, while the pot and object are rotating with an extraction mechanism which is rotating, at least initially, at the same speed as the pot.

2. The method of claim 1, wherein said object is extracted by gripping the object from above the pot while initially rotating said extraction mechanism at the same speed as that of the pot.

3. The method of claim 2, wherein the gripping of said object is accomplished by sealingly contacting the upper edge of said object with a gripping member, reducing the pressure within the zone defined by the interface between said object and said gripping member to secure said object to said gripping member, and raising the gripping member with the object adhered to it.

4. The method of claim 3, wherein said gripping member is raised slowly so as to cause minimum disturbance of said pulverulent refractory material.

5. The method of claim 3, wherein said gripping member is lowered vertically into said rotating pot such that a portion of said member contacts with the rim of said pot, thereby causing said member to rotate and wherein the the member is further lowered until it comes into bearing against the upper edge of the object.

6. In a method for making a fused silica glass object in a rotating pot by filling the pot with a pulverulent refractory material, rotating the pot to form a cavity in said pulverulent material, introducing a fusible, silica-rich glass forming material into the cavity, melting said silica-rich glass forming material to form a fused silica object in the shape of said cavity and with an open interior portion, and cooling the silica glass object produced, the improvement which comprises removing the fused silica glass object from said cavity by extracting the object vertically while the pot and object are rotating while sealingly contacting the upper edges of said object with a rotating gripping member; reducing the pressure between said object and said gripping member to secure said object to said gripping member, and raising the rotating gripping member with the object adhered to it at a rate which causes minimum disturbance to the pulverulent refractory material.

7. A method of making a fused silica glass object which comprises:
    filling a pot, capable of rotating about its axis with pulverulent refractory material;
    rotating the pot to form a cavity having a uniform boundary in said pulverulent refractory material, the axis of said cavity coinciding with the axis of the pot, and introducing a fusible silica-rich glass forming material into said cavity to form an object having a bottom and a wall of a predetermined thickness;

melting at least a portion of the thickness of said silica-rich glass forming material without melting said pulverulent refractory material to form a fused silica glass object, said object having an interior portion said portion coinciding with the axis of the pot;

cooling the object thus produced;

releasably contacting said object while the pot and object are rotating with an extraction mechanism which is rotating, at least initially, at the same speed as the pot; and extracting the object by vertically raising said extraction mechanism.

8. The method of claim 7, wherein said object is extracted by releasably gripping the object from above the pot.

9. The method of claim 8, wherein the gripping of said object is accomplished by sealingly contacting the upper edge of said object with a gripping member, reducing the pressure within the zone defined by the interface between said object and said gripping member to secure said object to said gripping member, and raising the extraction mechanism with the object adhered to the gripping member.

10. The method of claim 9 wherein the pressure in the interior portion of the object is reduced by connecting duct means for generating a vacuum through said extraction member and in communication with the interior portion of said object.

11. The method of claim 9, wherein said gripping member is raised slowly so as to cause minimum disturbance of said pulverulent refractory material.

12. The method of claim 11, wherein said gripping member is lowered vertically into said rotating pot such that a portion of said member contacts with the rim of said pot, thereby causing said member to rotate and wherein the member is further lowered until it comes into bearing against the upper edge of the object.

13. The method of claim 12, which further comprises aligning the axis of said extraction member with the axis of said pot.

14. The method of claim 13 wherein said aligning step is effectuated by providing said extraction member with a rotational synchronization member which assures contact with the outer edge of said pot.

15. The method of claim 14 wherein said aligning step includes engaging said outer edge of the pot with said rotational synchronization member by spring means.

16. The method of claim 15 wherein the pressure in the interior portion of the object is reduced by connecting duct means for generating a vacuum through said extraction member and in communication with the interior portion of said object.

* * * * *